United States Patent
Mathieu et al.

(10) Patent No.: US 6,306,359 B1
(45) Date of Patent: Oct. 23, 2001

(54) HYDROGENATION CATALYSTS, METHOD FOR MAKING SAME AND USE THEREOF FOR PREPARING HYDROGEN PEROXIDE

(75) Inventors: Véronique Mathieu, Wavre; Pascal Pennetreau, Rixensart; Noel Vanlautem, Wavre, all of (BE)

(73) Assignee: Solvay Interox (Societe Anon.) (BE)

( * ) Notice: Subject to any disclaimer, the term of this patent is extended or adjusted under 35 U.S.C. 154(b) by 0 days.

(21) Appl. No.: 09/269,877
(22) PCT Filed: Oct. 3, 1997
(86) PCT No.: PCT/BE97/00115
§ 371 Date: Jun. 22, 1999
§ 102(e) Date: Jun. 22, 1999
(87) PCT Pub. No.: WO98/15350
PCT Pub. Date: Apr. 16, 1998

(30) Foreign Application Priority Data

Oct. 4, 1996 (BE) .................................................. 09600835
Sep. 11, 1997 (BE) .................................................. 09700743

(51) Int. Cl.$^7$ .............................. C01C 15/01; B01J 21/06
(52) U.S. Cl. .......................... 423/588; 502/242; 585/250; 518/713; 568/881
(58) Field of Search ................................... 423/584, 588, 423/589, 590, 213.2; 502/242, 243, 244, 258, 259, 261, 262, 326, 330, 331, 245, 236, 239; 585/250; 518/713; 568/881

(56) References Cited

U.S. PATENT DOCUMENTS

| 4,007,256 | * | 2/1977 | Kim et al. | 423/584 |
| 4,240,933 | * | 12/1980 | Copelin | 502/174 |
| 4,601,996 | * | 7/1986 | Miller | 502/242 |
| 4,937,058 | * | 6/1990 | Dupin et al. | 423/224 |

OTHER PUBLICATIONS

Periodic Table of the Elements, CRC Handbook of Chemistry and Physics, 80th edition 1990–2000.*

*Ullman's Encyclopedia of Industrial Chemistry*, Fifth Completely Revised Edition, vol. A13: High Performance Fibers to Imidazole and Derivatives, pp. 444, col. 1, last paragraph (1989).

* cited by examiner

Primary Examiner—Steven P. Griffin
Assistant Examiner—Maribel Medina
(74) Attorney, Agent, or Firm—Larson & Taylor, PLC

(57) ABSTRACT

Hydrogenation catalysts based on palladium, platinum or rhodium comprising at least one other metal M which are deposited on zirconium oxide and silicon oxide supports. Process for the manufacture of these catalysts by successive impregnation of the support using palladium, platinum or rhodium and using another metal M. Use of these catalysts in hydrogenation reactions and in particular in preparing hydrogen peroxide.

10 Claims, 3 Drawing Sheets

HYDROGENATION CATALYSTS, METHOD FOR MAKING SAME AND USE THEREOF FOR PREPARING HYDROGEN PEROXIDE

FIELD OF THE INVENTION

The present invention relates to hydrogenation catalysts based on palladium, platinum or rhodium which is deposited on zirconium oxide and silicon oxide supports, to their process of manufacture and to their use in hydrogenation reactions and in particular in preparing hydrogen peroxide.

BACKGROUND OF THE INVENTION

The synthesis of hydrogen peroxide with the involvement of hydrogenation catalysts comprising palladium and silica is a reaction which has been known for a long time. Provision has also already been made in Patent Application EP-A1-0009802 for the preparation of hydrogen peroxide with the involvement of catalysts comprising palladium, zirconium oxide and silica.

Furthermore, Patent Application EP-A1-0149816 discloses specific catalysts based on palladium, zirconium oxide and silica.

SUMMARY OF THE INVENTION

The object of the present invention is to provide other hydrogenation catalysts which exhibit a high and stable catalytic activity.

Another object of the present invention is to provide hydrogenation catalysts which exhibit a high catalytic selectivity. Thus, the catalysts according to the invention, when they are used for the synthesis of hydrogen peroxide by the AO process (auto-oxidation process), limit the formation of decomposition products.

To this end, the invention relates to hydrogenation catalysts based on palladium, platinum or rhodium on a zirconium oxide and silicon oxide support comprising at least one other metal M and/or in which the support is not in the aerogel physical form.

The invention also relates to the process for the manufacture of these catalysts and to the use of these catalysts in hydrogenation reactions and in particular in preparing hydrogen peroxide.

DETAILED DESCRIPTION OF THE PREFERRED EMBODIMENTS

Figure 1:
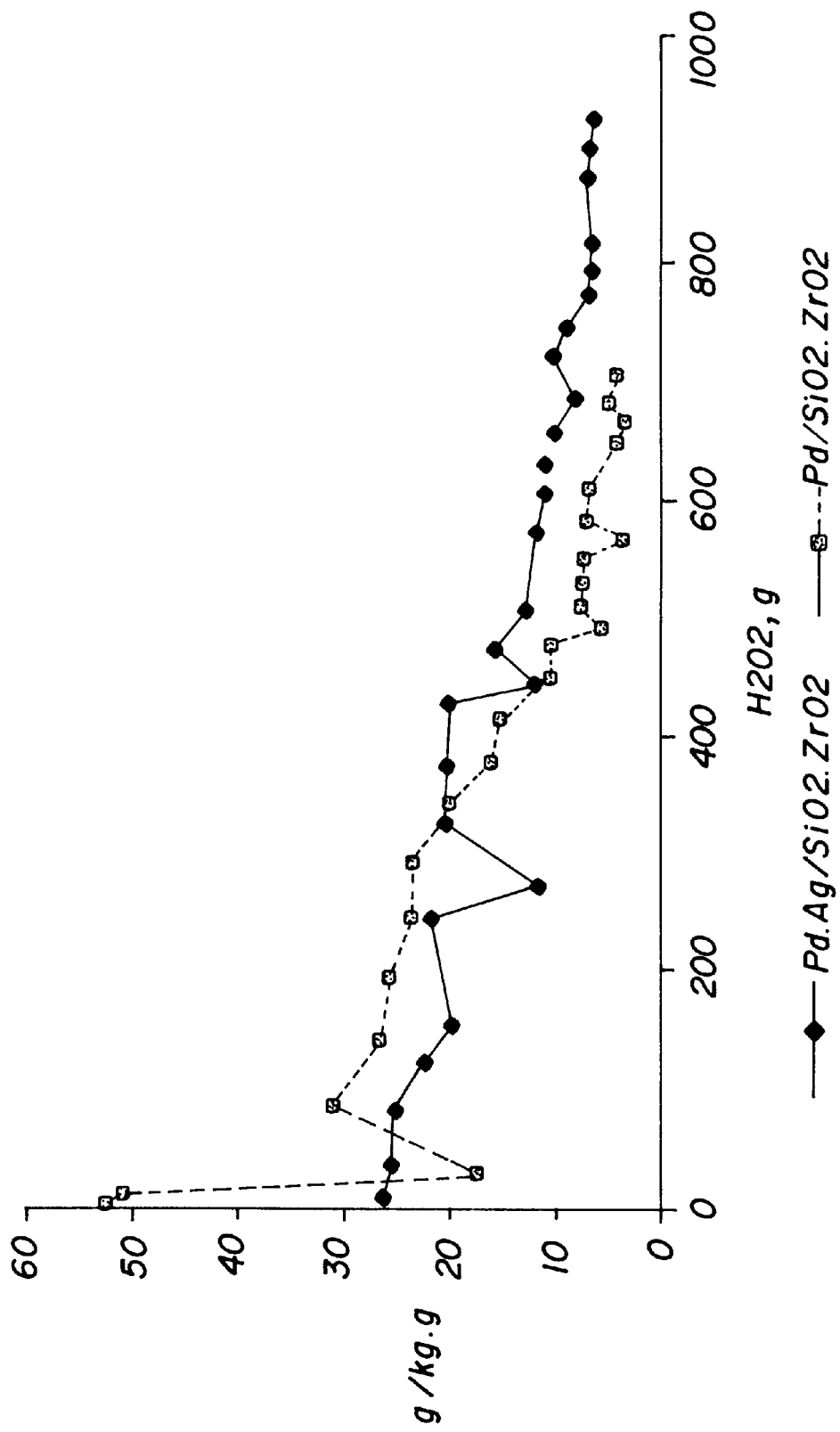
FIG. 1 shows a comparison of the change in the activity of the $Pd.Ag_{1\%}/SiO_2ZrO_2$ catalyst with that of the $Pd/SIO_2.ZrO_2$ catalyst.

In a first alternative form of the invention, the catalysts comprise, on the one hand, palladium, platinum or rhodium, palladium being preferred, and, on the other hand, at least one other metal M. The metal M can be chosen from the group consisting of silver, copper, gold, germanium, tin, iron, tellurium, nickel and their mixtures. The metal M is preferably chosen from silver, copper and gold. In a particularly preferred way, the metal M is silver or copper. Excellent results have been obtained by combining palladium and silver. The catalysts of the first alternative form of the invention are preferably composed essentially of palladium, platinum or rhodium and of another metal M on a zirconium oxide and silicon oxide support.

The support of the catalysts according to the invention comprises zirconium oxide and silicon oxide. The support can be in a crystalline, partially crystalline, amorphous or partially amorphous form. The support is advantageously amorphous. It preferably exhibits a homogeneous distribution between the zirconium oxide and the silicon oxide. The term "homogeneous distribution between the zirconium oxide and the silicon oxide" is understood to mean a distribution such that the experimental Zr/Si ratio, measured by X-ray photoelectron spectroscopy (XPS), does not differ by more than 20% from the theoretical Zr/Si ratio drawn up by calculation on the basis of the chemical composition of the support. The supports in which the difference between the experimental Zr/Si ratio, measured by XPS, and the theoretical Zr/Si ratio does not exceed 10% are very particularly preferred.

In a second alternative form of the invention, the presence of the metal M in the catalysts according to the invention as defined above is optional. In this case, the support is not in the physical form of an aerogel. Such catalysts can be employed in the liquid phase without exhibiting the filtration disadvantages observed with catalysts based on aerogels.

In the catalysts according to the invention, the palladium, platinum or rhodium and the metal M (in the first alternative form) can be in the elemental state or in the form of a compound, such as a salt or an oxide. The catalysts preferably comprise palladium, platinum or rhodium and the metal M in the elemental state.

The amount of palladium, platinum or rhodium in the catalysts is advantageously at least 0.1%, preferably at least 0.2%, by weight with respect to the total weight of the catalyst, that is to say of the combined metal compounds and support. In the catalysts of the second alternative form in particular, use is preferably made of an amount of palladium, platinum or rhodium of at least 0.5%, indeed even of at least 1%, by weight with respect to the weight of the catalyst. The amount of palladium, platinum or rhodium usually does not exceed 5% of the weight of the catalyst. It preferably does not exceed 4%, indeed even 3%.

The amount of the metal M in the catalysts of the first alternative form of the invention is advantageously at least 0.1%, preferably at least 0.2%, by weight with respect to the weight of the catalyst. The amount of this metal M usually does not exceed 5% by weight with respect to the weight of the catalyst. It preferably does not exceed 4%.

In the catalysts of the first alternative form of the invention, the ratio by weight of the palladium, platinum or rhodium to the metal M is preferably at least 0.05. In a particularly preferred way, this ratio by weight is at least 0.1. In a very particularly preferred way, this ratio is at least 0.25. The ratio by weight of the palladium, platinum or rhodium to the metal M preferably does not exceed 20. In a particularly preferred way, this ratio does not exceed 10. In a very particularly preferred way, this ratio does not exceed 4.

The amount of zirconium oxide in the catalysts is advantageously at least 1%, preferably at least 2%, by weight with respect to the weight of the catalyst. The amount of zirconium oxide usually does not exceed 10% by weight with respect to the weight of the catalyst. It preferably does not exceed 5%.

The amount of silicon oxide generally represents at least 75% by weight with respect to the weight of the catalyst, in particular at least 80%, indeed even 85%. The amount of silicon oxide is usually less than or equal to 98.8%, in particular 95%.

Catalysts of the first alternative form of the invention which give good results comprise:
- from 0.5 to 2.5% of Pd, Pt or Rh by weight with respect to the weight of the catalyst,
- from 0.5 to 2.5% of metal M by weight with respect to the weight of the catalyst,
- from 4 to 6% of $ZrO_2$ by weight with respect to the weight of the catalyst, and
- from 89 to 95% of $SiO_2$ by weight with respect to the weight of the catalyst.

Catalysts of the second alternative form of the invention which give good results comprise:
- from 15 to 25 g of Pd/kg of catalyst,
- from 40 to 60 g of $ZrO_2$/kg of catalyst,
- from 945 to 915 g of $SiO_2$/kg of catalyst.

In addition, the catalysts according to the invention can optionally comprise at least one additional metal chosen from the metals from group IB, IIB, IIIA, IVA, VA and VIII, in the elemental state or in the form of a compound of this metal (the groups are designated according to the CAS nomenclature as repeated in the CRC Handbook of Chemistry and Physics, 75th Edition, 1994–1995, D. R. Lide, cover page). If appropriate, the amount of this additional metal does not exceed 50% by weight of the overall weight of palladium, platinum or rhodium and of the metal M.

The catalysts of the invention can be prepared by the usual techniques, such as, for example for the catalysts of the first alternative form, by co-impregnation of the metals on the support, by co-precipitation of the metals on the support or by successive depositions of the metals on the support. The catalysts of the first alternative form according to the invention are advantageously prepared by successive depositions, on the one hand, of the palladium, platinum or rhodium and, on the other hand, of the metal M in any order on a zirconium oxide and silicon oxide support by impregnation. Preferably, the support is first impregnated with the palladium, platinum or rhodium and subsequently with the other metal M. The support can be impregnated using solutions comprising the metal constituents of the catalyst. The impregnation solutions are preferably saline aqueous solutions. The salts used to this end are in particular chlorides, nitrates, acetates or ammoniacal complexes. The metal M is preferably deposited by impregnation of a $Pd/SiO_2.ZrO_2$, $Pt/SiO_2.ZrO_2$ or $Rh/SiO_2.ZrO_2$ catalyst with a solution comprising the metal constituent M under a reducing atmosphere, such as, for example, a hydrogen atmosphere. The deposition of the metal M by reduction with hydrogen or by any other form of reduction also results in the reduction of the palladium, platinum or rhodium. The catalysts can subsequently be filtered off, washed and dried.

Thus, the $Pd.Ag/SiO_2.ZrO_2$ catalysts can be prepared by suspending a $Pd/SiO_2.ZrO_2$ catalyst in an $AgNO_3$ solution and by reducing the metals by sparging with hydrogen. The $Pd.Cu/SiO_2.ZrO_2$ catalysts can be prepared in the same way starting with a $CuCl_2$ solution.

The catalysts of the invention unexpectedly exhibit a much greater catalytic selectivity than that observed with the catalysts disclosed in Patent Application EP-A1-0009802.

This is because, when catalysts in accordance with the present invention are used in the synthesis of hydrogen peroxide by the AO process, a reduced rate of formation of the decomposition products of amylanthra-quinone (AQ) and of amyltetrahydroanthraquinone (ATQ) is observed.

The catalysts according to the present invention are suitable for all types of hydrogenation catalysis. The invention consequently also relates to their use in hydrogenation reactions. Mention may be made, as examples of hydrogenation reactions, of the hydrogenation of alkynes to alkenes, the hydrogenation of CO to methanol and the reduction of unsaturated aldehydes to unsaturated alcohols. The catalysts according to the invention are used with very good results in processes for the manufacture of hydrogen peroxide. Consequently, the invention also relates to a process for the manufacture of hydrogen peroxide in their presence.

A process for the synthesis of hydrogen peroxide which has given particularly advantageous results in the presence of the catalysts of the invention is the process for the synthesis of hydrogen peroxide known under the name of AO process or anthraquinone process. This process is described in particular in the work Ullmann's Encyclopedia of Industrial Chemistry, 5th Edition, 1989, Vol. A13, p. 443 et seq. The catalysts according to the present invention with palladium give excellent results, in particular those of the first alternative form, especially when the metal M is silver or copper.

The examples which follow are intended to illustrate the present invention without, however, limiting the scope thereof.

EXAMPLE 1

Synthesis of a $Pd/ZrO_2.SiO_2$ Catalyst According to Example 2 of European Patent Application 0 009 802. Silica Support 10 g of amorphous silica, the characteristics of which are specified below, were brought to boiling point in 100 ml of 5% nitric acid for 5 min with gentle stirring and subsequently cooled, filtered off and washed with 900 ml of demineralized water until the aqueous wash liquors were found to be at a neutral pH. The wet filtration product was resuspended in 45 ml of demineralized water; 4.75 ml of a solution of $PdCl_2$ dissolved in HCl (25 g Pd/l N HCl) and then 0.37 ml of a 0.5 molar aqueous $Zr(NO_3)_4$ solution were subsequently added to the suspension. The combined mixture was brought to 85° C. and a saturated $Na_2CO_3$ solution was added in order to reach the final pH of 10, in order to ensure the complete precipitation of the hydroxides. 3.1 ml of a 37% aqueous formaldehyde solution were subsequently added to the suspension and the latter was stirred for 10 min. The catalyst was filtered off and washed with approximately 600 ml of demineralized water (until the aqueous wash liquors were found to be at a neutral pH); finally, it was dried under vacuum at 130–140° C. for 3 h.

The characteristics of the support obtained and of the catalyst formed are as follows:

|  | Support | Catalyst obtained |
|---|---|---|
| $ZrO_2$ content in g/kg (emission spectrometry) | — | 44 |
| BET surface in $m^2$/g ($N_2$ adsorption/desorption) | 292 | 351 |
| Pore volume in $cm^3$/g | 1.2 | 1.25 |
| Mean diameter of the pores in nm | 9 | 11 |
| Pd content in g/kg (amounts employed) | — | 20 |
| Dispersion of the Pd in % (CO adsorption/desorption) | — | 23 |

-continued

| | Support | Catalyst obtained |
|---|---|---|
| Surface occupied by the metal in $m^2$ Pd/g of catalyst | — | 2.0 |
| Experimental Zr/Si ratio (X-ray photoelectron spectroscopy - XPS) | — | 0.041 |
| Theoretical Zr/Si ratio, drawn up by calculation | — | 0.025 |
| Number of acid sites/$g_{support}$ ($NH_3$ adsorption) | $1.1\ 10^{20}$ | |

EXAMPLE 2

Synthesis of a Pd/SiO$_2$.ZrO$_2$ Catalyst According to the Invention 10 g of support, the characteristics of which are specified below, were suspended in 100 ml of demineralized water. 20 ml of a solution of PdCl$_2$ dissolved in HCl (10 $g_{Pd}/l_{NHCl}$) were added to the suspension and then approximately 25 ml of an N NaOH solution were added dropwise with good stirring while taking care to maintain the pH at approximately 8. The catalyst was subsequently filtered off and washed with approximately 600 ml of demineralized water until the aqueous wash liquors were found to be at a neutral pH. The catalyst was dried at atmospheric pressure for approximately 16 h at 100° C.

| | Support | Catalyst obtained |
|---|---|---|
| ZrO$_2$ content in g/kg (emission spectrometry) | 49 | 49 |
| BET surface in $m^2$/g ($N_2$ adsorption/desorption) | 291 | 342 |
| Pore volume in cm$^3$/g | 1.6 | 1.15 |
| Mean diameter of the pores in nm | 12 | 8 |
| Pd content in g/kg (amounts employed) | — | 20 |
| Dispersion of the Pd in % (CO adsorption/desorption) | — | 10 |
| Surface occupied by the metal in $m^2$ Pd/g of catalyst | — | 0.9 |
| Experimental Zr/Si ratio (XPS spectroscopy) | — | 0.026 |
| Theoretical Zr/Si ratio, drawn up by calculation | — | 0.025 |
| Number of acid sites/$g_{support}$ ($NH_3$ adsorption) | $2.5\ 10^{20}$ | |

EXAMPLE 3

Synthesis of a Pd/SiO$_2$ Catalyst According to Example 2 of European Patent Application 0009802 but without the use of ZrO$_2$.

The method used is that of Example 1 R, except that the zirconium salt is not added. The characteristics of the support employed and of the catalyst synthesized are presented below.

| | Support | Catalyst obtained |
|---|---|---|
| BET surface in $m^2$/g (emission spectrometry) | 292 | 292 |
| Pore volume in cm$^3$/g ($N_2$ adsorption/desorption) | 1.2 | 1.2 |
| Mean diameter of the pores in nm | 9 | 9 |
| Pd content in g/kg (amounts employed) | — | 20 |
| Dispersion of the Pd in % (CO adsorption/desorption) | — | 10 |
| Surface occupied by the metal in $m^2$ Pd/g of catalyst | — | 0.9 |
| Number of acid sites/$g_{support}$ ($NH_3$ adsorption) | $1.1\ 10^{20}$ | |

EXAMPLES 4–6

The catalysts of Examples 1 R, 2 and 3 R were evaluated from the viewpoint of their activity and of their selectivity in the hydrogenation of amylanthra-quinone (AQ) in solution in a diisobutylcarbinol-Solvesso 150 mixture. The initial rate of consumption of hydrogen was measured and the significance of the processes for the conversion of amylanthraquinone to amyltetrahydro-anthraquinone (ATQ), amyloxanthrone (AO) and amylanthrone (AA), as well as the conversion of amyltetrahydro-anthraquinone to amyltetrahydrodihydrooxanthrone (ATDO), are expressed as a function of the amount of hydrogen peroxide produced over time.

Procedure for the hydrogenation of amylamthraquinone in a batch reactor: the working solution (1.0 kg), composed of 70 g/kg of amylanthraquinone dissolved in the diisobutylcarbinol-Solvesso 150 mixture (20/80 ratio by weight), which is saturated with water, was hydrogenated at 55° C. under a constant pressure of 1.1 bar absolute. The catalyst (6 g/kg$_{working\ solution}$) was kept in suspension using a stirrer of turbine type rotating at 1300 rpm.

Procedure for evaluating the catalysts in a continuous hydrogenation reactor: the plant was composed of a hydrogenator, an oxidizer and an extraction column placed in series, the oxidized working solution being recycled to the hydrogenator after extraction of the hydrogen peroxide produced by oxidation with oxygen of the hydroanthraquinone manufactured in the hydrogenator. The working solution was composed of 70 g/kg of amylanthraquinone in the diisobutylcarbinol (20 weight %)-Solvesso 150 (80 weight %) mixture. The total working solution volume was 1260 ml and its flow rate was 6 ml/min. The temperature in the hydrogenator was 50° C., the hydrogen pressure was 1.8 bar absolute and the concentration of the catalyst was 100 g/l. The mean residence time of the working solution in the hydrogenator was 33 min. The oxidizer operated at 45° C. The composition of the working solution was established by HPLC chromatography and its change was monitored over time and as a function of the amount of hydrogen peroxide produced. The selectivity of the catalysts was established on the basis of the amounts of AQ converted to ATQ, AO and AA, and of ATDO produced from ATQ, with respect to a unit amount of hydrogen peroxide produced.

The results obtained are combined in Table I below. The rates are expressed therein as g of product considered per kg of solution and per g of $H_2O_2$ produced.

| Example | 4 | 5 | 6 | Procedure |
|---|---|---|---|---|
| Catalyst employed | 1R | 2 | 3R | |
| Relative catalytic activity | 1.2 | 1.3 | 1.0 | batch |
| Rate of decomposition of AQ | −1.8 | −1.1 | −1.9 | continuous |
| Rate of formation of ATQ | 1.4 | 0.5 | 1.5 | continuous |
| Rate of formation of AO | 0.2 | 0.3 | 0.2 | continuous |
| Rate of formation of AA | 0.2 | 0.2 | 0.2 | continuous |
| Rate of decomposition of ATQ | −0.2 | 0.0 | −0.1 | continuous |
| Rate of formation of ATDO | 0.06 | 0.004 | 0.07 | continuous |

It can be deduced from the above results and more particularly from the rate of formation of ATQ that the selectivity of hydrogenation of the starting quinone is two to three times greater than that obtained with the 1R and 3R catalysts of the prior art.

Furthermore, it can also be observed, by the rate of formation of ATDO, that the formation of the byproducts is significantly reduced in the process according to the invention in comparison with what is observed with the catalysts of Examples 1R and 3R of the prior art.

EXAMPLES 7 to 9

Synthesis of Pd.Ag/$SiO_2$.$ZrO_2$ Catalysts According to the Invention 20 g of Pd/$SiO_2$.$ZrO_2$ catalyst of Example 2 were suspended in 400 ml of water in a sparger equipped with a sintered plate. After having purged the mixture under nitrogen for a few minutes, hydrogen was introduced at a flow rate of approximately 700 ml/min. 10 ml (Example 7), 20 ml (Ex. 8) or 40 ml (Ex. 9) of a 0.1N $AgNO_3$ solution were subsequently added for the purpose of obtaining catalysts respectively comprising 0.5%, 1.0% or 2.0% of silver (by weight with respect to the weight of the catalyst). The hydrogen was allowed to sparge through for 1 hour. The catalysts were subsequently filtered off, washed with demineralized water until the aqueous wash liquors were found to be at a neutral pH, and dried at atmospheric pressure for approximately 16 hours at 100° C.

EXAMPLES 10 and 11

Synthesis of Pd.Cu/$SiO_2$.$ZrO_2$ Catalysts According to the Invention

Pd.Cu/$SiO_2$.$ZrO_2$ catalysts, respectively comprising 0.5% (Ex. 10) and 0.9% (Ex. 11) of copper (by weight with respect to the weight of the catalyst), were prepared according to the same procedure as the Pd.Ag/$SiO_2$.$ZrO_2$ catalysts of Examples 7 to 9, apart from the fact that the $AgNO_3$ solution was replaced by a 26.8 g/kg $CuCl_2$.$2H_2O$ solution (10 g/l of $Cu^{++}$)

EXAMPLES 12 and 13

Continuous Hydrogenation of a Mixture of Amylanthraquinone and Amyltetrahydroanthraquinone by the Pd/$SiO_2$.$ZrO_2$ and Pd.$Ag_{1\%}$/$SiO_2$.$ZrO_2$ Catalysts According to the Invention The catalysts of Examples 2 and 8 were evaluated from the viewpoint of their operational activity, of the change in their activity over time and from the viewpoint of their selectivity in the continuous hydrogenation of a mixture of amylanthraquinone (AQ) and amyltetrahydroanthraquinone (ATQ) in solution in a DBC-S 150 mixture.

The test plant is composed of a hydrogenator, an oxidizer and an extraction column placed in series. The hydrogen peroxide is produced by oxidation with oxygen of the amylanthrahydroquinone (AQH) and the amyltetrahydroanthrahydroquinone (ATQH) manufactured in the hydrogenator. After extraction of the hydrogen peroxide, the oxidized working solution is recycled to the hydrogenator. The working solution is composed of 25 g/kg of amylanthraquinone and of 75 g/kg of amyltetrahydroanthraquinone dissolved in the DBC-S 150 (20/80) mixture. The total volume of the working solution is 1260 ml and its flow rate is 6 ml/min. The temperature in the hydrogenator is 55° C. and the hydrogen pressure is 2 bar absolute. The concentration of the catalyst is adjusted in order to compensate for the initial deactivation and to keep the degree of hydrogenation more or less constant (~50–55%): the test is begun with a limited amount of catalyst; fresh catalyst is added periodically. The residence time of the working solution in the hydrogenator is 33 minutes. The oxidizer operates at 45° C.

The composition of the working solution is established by HPLC chromatography and its change is monitored over time and as a function of the amount of hydrogen peroxide produced.

Figure 2:
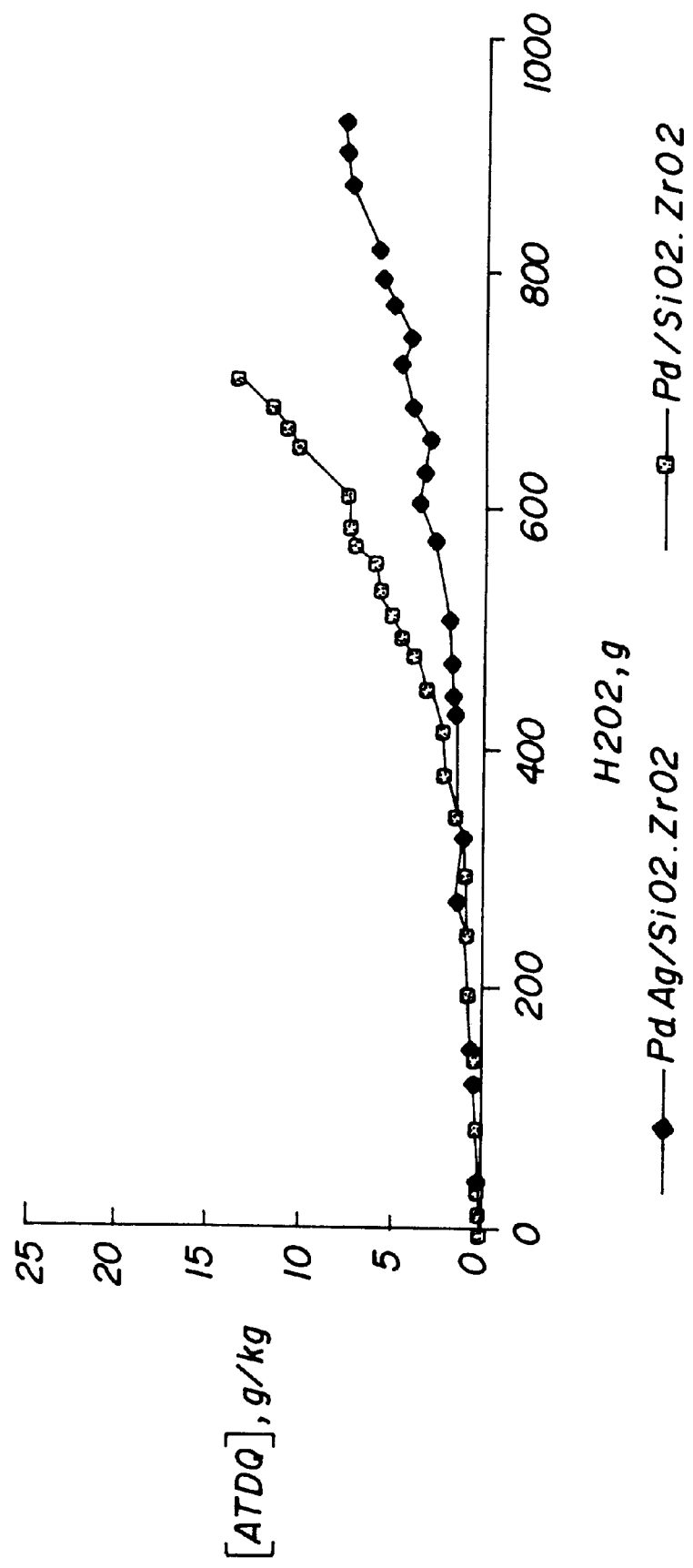
FIG. 2 shows the change in the concentration of amyltetrahydrodihydroanthraquinone (ATDQ) as a function of the cumulative amount of hydrogen peroxide produced.
Figure 3:
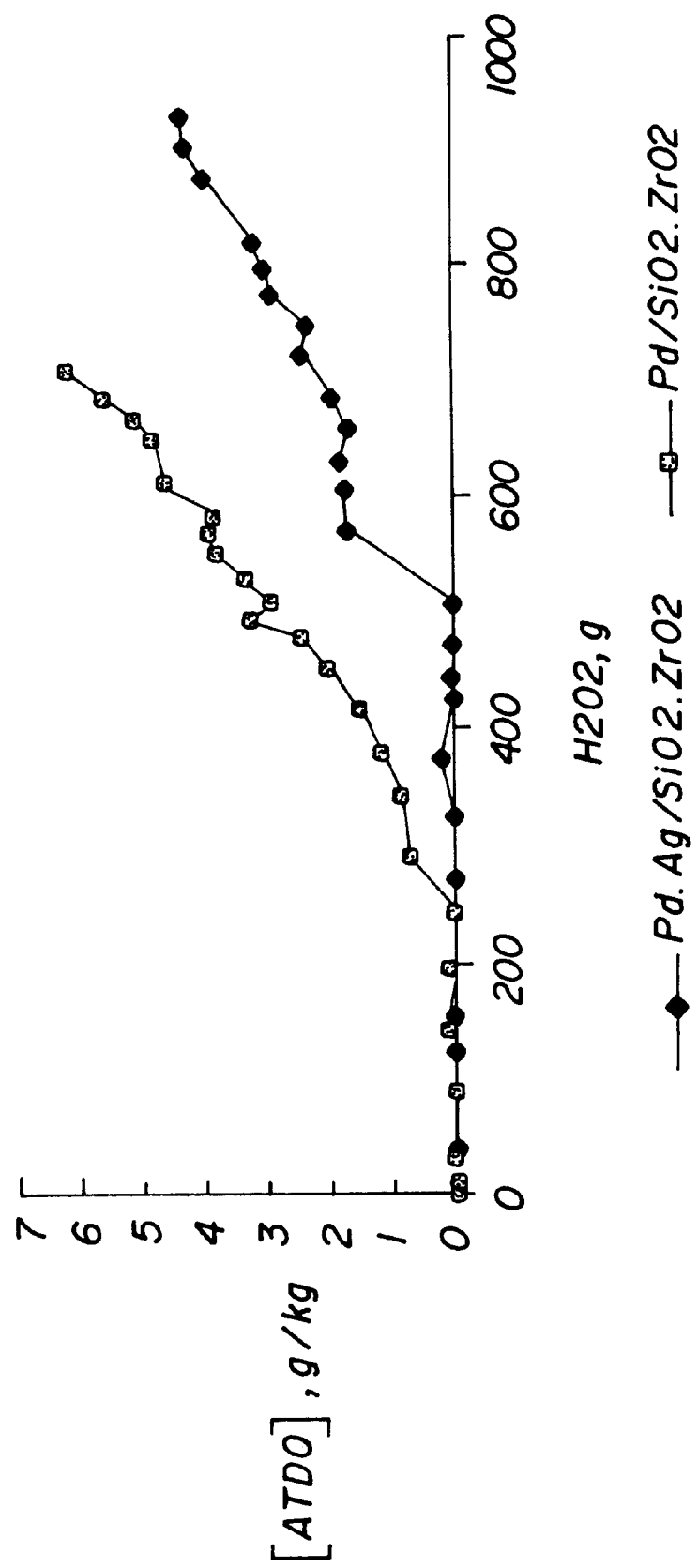
FIG. 3 shows the change in the concentration of amyltetrahydrodihydrooxanthrone (ATDQ) as a function of the cumulative amount of hydrogen peroxide produced.

The results are presented in FIGS. 1 to 3. They clearly demonstrate the influence of the addition of silver on the operational activity of the catalyst, on the change in its activity over time and on its selectivity.

The graph in FIG. 1 compares the change in the activity of the Pd.$Ag_{1\%}$/$SiO_2$.$ZrO_2$ catalyst (Example 13) with that of the Pd/$SiO_2$.$ZrO_2$ catalyst (Example 12). The curves represent the change in the hydrogenated quinones (mixture of AQH and ATQH) produced per g of catalyst, as a function of the cumulative amount of hydrogen peroxide produced.

The graphs in FIGS. 2 and 3 compare the change in two decomposition compounds of the working solutions in the presence of the Pd.$Ag_{1\%}$/$SiO_2$.$ZrO_2$ catalyst or of the Pd/$SiO_2$.$ZrO_2$ catalyst.

The graph in FIG. 2 represents the change in the concentration of amyltetrahydrodihydroanthraquinone (ATDQ) as a function of the cumulative amount of hydrogen peroxide produced.

The graph in FIG. 3 represents the change in the concentration of amyltetrahydrodihydrooxanthrone (ATDO) as a function of the cumulative amount of hydrogen peroxide produced.

What is claimed is:

1. Hydrogenation catalysts based on palladium, platinum or rhodium on a zirconium oxide and silicon oxide support comprising at least one metal M from group IB and wherein the amount of palladium, platinum or rhodium is from 0.1 to 5% by weight with respect to the weight of the catalyst, the amount of metal M is from 0.1 to 5% by weight with respect to the weight of the catalyst, the ratio by weight of the palladium, platinum or rhodium to the metal M is from 0.05 to 20 and the amount of zirconium oxide is from 1 to 10% by weight with respect to the weight of the catalyst.

2. Hydrogenation catalysts based on palladium, platinum or rhodium on a zirconium oxide and silicon oxide support according to claim 1 wherein the support is not in an aerogel physical form.

3. Catalysts according to claim 1, wherein the metal M is selected from the group consisting of silver, copper and gold.

4. Catalysts according to claim 3, characterized in that the metal M is silver or copper.

5. Catalysts according to claim 1, comprising:
from 0.5 to 2.5% of Pd, Pt or Rh by weight with respect to the weight of the catalyst,
from 0.5 to 2.5% of metal M by weight with respect to the weight of the catalyst,
from 4 to 6% of $ZrO_2$ by weight with respect to the weight of the catalyst, and
from 89 to 95% of $SiO_2$ by weight with respect to the weight of the catalyst.

6. Catalysts according to claim 1, characterized in that the support exhibits a homogeneous distribution between the zirconium oxide and the silicon oxide.

7. Catalysts according to claim 1, comprising:
from 15 to 25 g of palladium per kg of catalyst,
from 40 to 60 g of $ZrO_2$ per kg of catalyst,
from 945 to 915 g of $SiO_2$ per kg of catalyst.

8. Process for the manufacture of hydrogenation catalysts based on palladium, platinum or rhodium on a zirconium oxide and silicon oxide support and comprising at least one other metal M from group IB and wherein the amount of palladium, platinum or rhodium is from 0.1 to 5% by weight with respect to the weight of the catalyst, the amount of metal M is from 0.1 to 5% by weight with respect to the weight of the catalyst, the ratio by weight of the palladium, platinum or rhodium to the metal M is from 0.05 to 20 and the amount of zirconium oxide is from 1 to 10% by weight with respect to the weight of the catalyst, the process comprising successively impregnating the palladium, platinum or rhodium and the metal M on a zirconium oxide and silicon oxide support.

9. Process for the manufacture of hydrogen peroxide using an anthraquinone auto-oxidation process comprising carrying out a reaction using a catalyst based on palladium, platinum or rhodium on a zirconium oxide and silicon oxide support which comprises at least one other metal M from group IB.

10. Process for the manufacture of hydrogen peroxide comprising carrying out a reaction using a catalyst based on palladium, platinum or rhodium on a zirconium oxide and silicon oxide support according to claim 9 wherein the support is not in an aerogel physical form.

* * * * *